(12) United States Patent
Dedrickson et al.

(10) Patent No.: US 11,469,645 B2
(45) Date of Patent: Oct. 11, 2022

(54) POWER TOOL

(71) Applicant: MILWAUKEE ELECTRIC TOOL CORPORATION, Brookfield, WI (US)

(72) Inventors: Ryan A. Dedrickson, Sussex, WI (US); Ian Duncan, Milwaukee, WI (US); Timothy R. Reichert, Franklin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 935 days.

(21) Appl. No.: 16/252,757

(22) Filed: Jan. 21, 2019

(65) Prior Publication Data

US 2019/0229579 A1 Jul. 25, 2019

Related U.S. Application Data

(60) Provisional application No. 62/620,542, filed on Jan. 23, 2018.

(51) Int. Cl.
| | | |
|---|---|---|
| *F16H 37/00* | (2006.01) | |
| *H02K 7/14* | (2006.01) | |
| *F16H 1/28* | (2006.01) | |
| *F16H 57/08* | (2006.01) | |
| *F16D 1/10* | (2006.01) | |
| *H02K 9/04* | (2006.01) | |
| *F16C 19/06* | (2006.01) | |
| *B25F 5/00* | (2006.01) | |

(Continued)

(52) U.S. Cl.
CPC .............. *H02K 7/14* (2013.01); *B25F 5/001* (2013.01); *B25F 5/008* (2013.01); *F16C 19/06* (2013.01);

(Continued)

(58) Field of Classification Search
CPC .......... H02K 9/06; H02K 7/145; B25F 5/008; F16H 1/28; F16H 2057/02034
See application file for complete search history.

(56) References Cited

U.S. PATENT DOCUMENTS

| | | | | |
|---|---|---|---|---|
| 3,670,190 A | * | 6/1972 | Goebel | .................... H02K 9/06 |
| | | | | 310/83 |
| 5,634,274 A | * | 6/1997 | Ohkouchi | ................ H02K 9/06 |
| | | | | 30/390 |

(Continued)

FOREIGN PATENT DOCUMENTS

| | | |
|---|---|---|
| CN | 105245058 A | 1/2016 |
| CN | 205141921 U | 4/2016 |

(Continued)

OTHER PUBLICATIONS

Examination Report issued by the European Patent Office for Application No. 19152666.4 dated Oct. 22, 2020 (8 pages).

*Primary Examiner* — Jake Cook
(74) *Attorney, Agent, or Firm* — Michael Best & Friedrich LLP

(57) ABSTRACT

A power tool includes an electric motor having an output shaft, a transmission having a transmission housing, a spindle rotatable in response to receiving torque from the transmission and a pinion coupled to the output shaft. The pinion includes a bushing portion, a toothed portion for driving the transmission, and a cylindrical portion between the bushing portion and the toothed portion. The power tool further comprises a fan coupled to the bushing portion of the pinion and a bearing arranged between the cylindrical portion and the transmission housing for rotatably supporting the pinion and the output shaft.

17 Claims, 3 Drawing Sheets

(51) Int. Cl.
*F16H 57/04* (2010.01)
*H02K 7/116* (2006.01)
*H02K 7/00* (2006.01)
*H02K 9/06* (2006.01)

(52) U.S. Cl.
CPC .............. *F16D 1/101* (2013.01); *F16H 1/28* (2013.01); *F16H 57/0416* (2013.01); *F16H 57/08* (2013.01); *H02K 7/145* (2013.01); *H02K 9/04* (2013.01); *F16C 2380/27* (2013.01); *F16D 2001/103* (2013.01); *F16H 57/0495* (2013.01); *H02K 7/003* (2013.01); *H02K 7/116* (2013.01); *H02K 9/06* (2013.01)

(56) References Cited

U.S. PATENT DOCUMENTS

| | | | |
|---|---|---|---|
| 6,543,549 B1 * | 4/2003 | Riedl | B25F 5/02 173/171 |
| 6,661,148 B2 | 12/2003 | Oomori et al. | |
| 7,878,772 B2 | 2/2011 | Rexhaüser et al. | |
| 7,969,050 B2 | 6/2011 | Zhang | |
| 8,096,857 B2 | 1/2012 | Holfmann et al. | |
| 9,844,869 B2 | 12/2017 | Ulrich et al. | |
| 2007/0138902 A1 | 6/2007 | Ahn et al. | |
| 2007/0295568 A1 | 12/2007 | Vasilescu | |
| 2013/0075121 A1 | 3/2013 | Nakamura et al. | |
| 2017/0326712 A1 | 11/2017 | Li et al. | |

FOREIGN PATENT DOCUMENTS

| | | |
|---|---|---|
| CN | 206092440 U | 4/2017 |
| CN | 206099654 U | 4/2017 |
| DE | 1932880 A1 | 1/1971 |
| DE | 102014225945 A1 | 6/2016 |
| DE | 102017211773 A1 | 1/2018 |
| GB | 2268112 A | 1/1994 |
| JP | 2007006554 A | 1/2007 |

* cited by examiner

POWER TOOL

CROSS-REFERENCE TO RELATED APPLICATIONS

This application claims priority to U.S. Provisional Patent Application No. 62/620,542 filed on Jan. 23, 2018, the entire content of which is incorporated herein by reference.

FIELD OF THE INVENTION

The present invention relates to power tools, and more particularly to power tool drive assemblies.

BACKGROUND OF THE INVENTION

Power tools include electric motors having an output shaft to which a pinion is attached to transfer torque from the motor to a transmission. Fans are sometimes rotatably coupled to the output shaft to cool the motor as the output shaft rotates.

SUMMARY OF THE INVENTION

The present invention provides, in one aspect, a power tool comprising an electric motor including an output shaft, a transmission including a transmission housing, a spindle rotatable in response to receiving torque from the transmission, and a pinion coupled to the output shaft. The pinion includes a bushing portion, a toothed portion for driving the transmission, and a cylindrical portion between the bushing portion and the toothed portion. The rotary power tool also includes a fan coupled to the bushing portion of the pinion and a bearing arranged between the cylindrical portion and the transmission housing for rotatably supporting the pinion and the output shaft.

The present invention provides, in another aspect, a power tool comprising an electric motor including an output shaft, a transmission including a transmission housing, a spindle rotatable in response to receiving torque from the transmission, and a pinion coupled to the output shaft. The pinion includes a bushing portion including splines, a toothed portion for driving the transmission, and a cylindrical portion between the bushing portion and the toothed portion. The power tool further comprises a fan including corresponding splines that couple the fan to the splines of the bushing portion, such that the fan is coupled for co-rotation with the bushing portion. The power tool further comprises a bearing rotatably supporting the pinion and the output shaft. The bearing includes an inner race coupled to the cylindrical portion of the pinion, an outer race coupled to the transmission housing, and a plurality of rollers between the inner race and the outer race.

The present invention provides, in yet another aspect, a power tool comprising an electric motor including an output shaft, a transmission including a transmission housing and a plurality of planet gears, a spindle rotatable in response to receiving torque from the transmission, and a pinion coupled to the output shaft. The pinion includes a bushing portion including splines, a toothed portion extending through an opening in the transmission housing and meshed with the planet gears in the transmission housing, and a cylindrical portion between the bushing portion and the toothed portion. The power tool further comprises a fan including corresponding splines that couple the fan to the splines of the bushing portion, such that the fan is coupled for co-rotation with the bushing portion. The power tool also comprises a bearing rotatably supporting the pinion and the output shaft. The bearing includes an inner race coupled to the cylindrical portion of the pinion, an outer race positioned within a recess in the transmission housing adjacent the opening, and a plurality of rollers between the inner race and the outer race.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
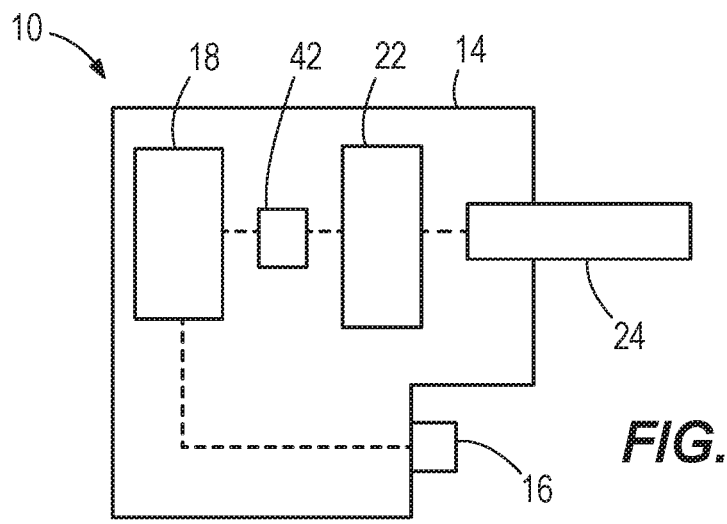
FIG. 1 is a schematic view of a power tool in accordance with an embodiment of the invention.
Figure 2:
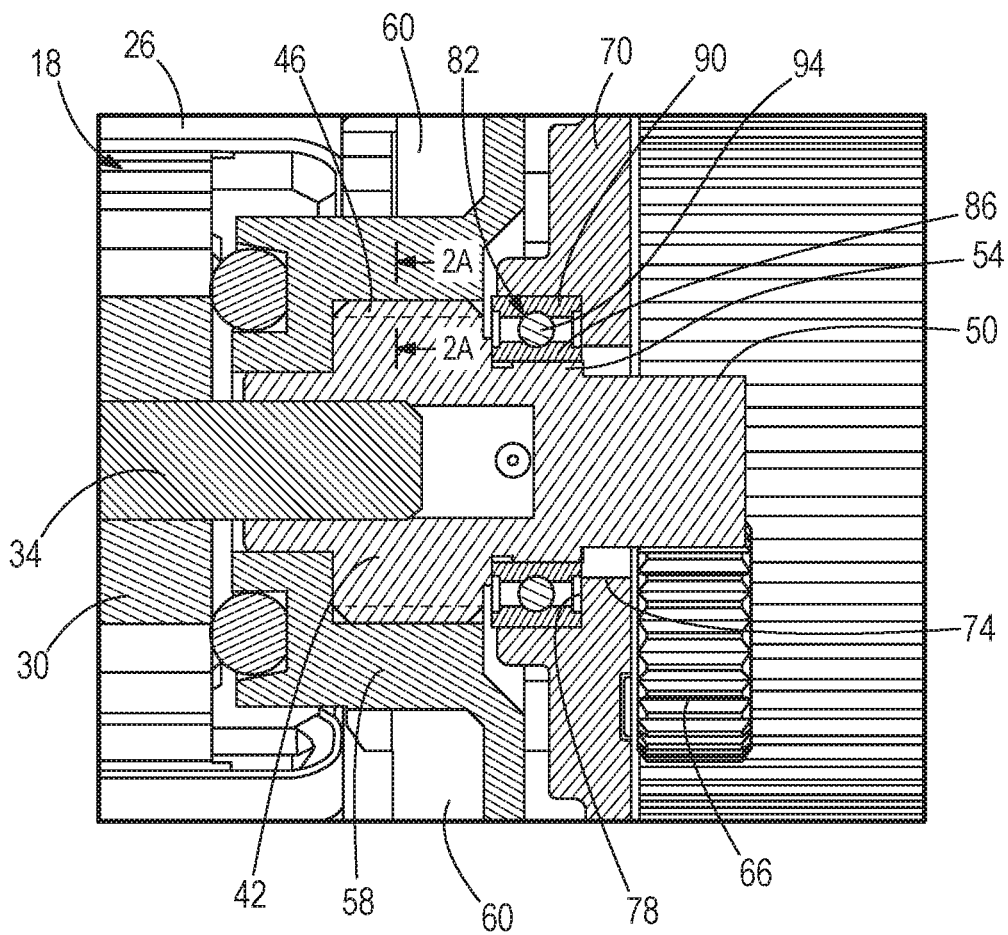
FIG. 2 is an enlarged cross-sectional view of the power tool of FIG. 1.
Figure 4:
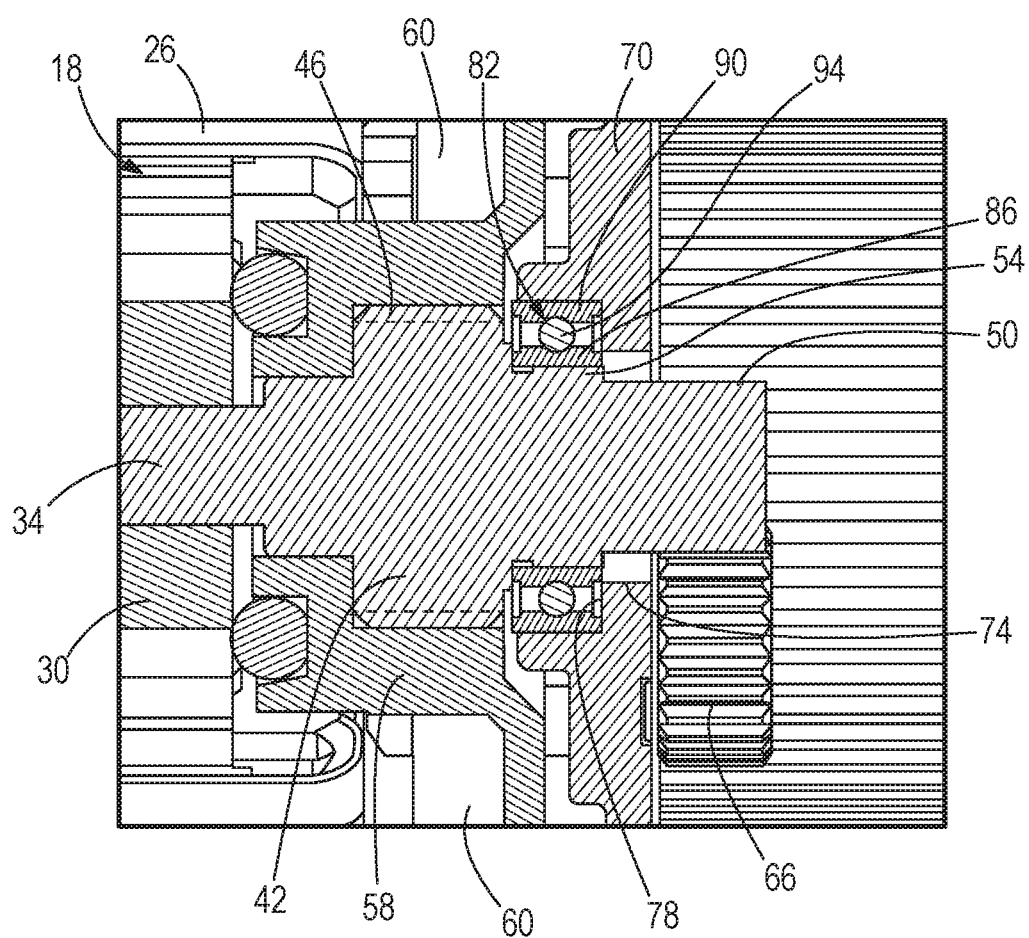
FIG. 4 is an enlarged cross-sectional view of the power tool of FIG. 1, according to another embodiment of the invention.

As shown schematically in FIG. 1, a power tool, such as a rotary power tool 10, includes a housing 14, a trigger 16 on the housing 14, an electric motor 18, a multi-stage planetary transmission 22, and a spindle 24 that receives torque from the motor 18 via the transmission 22 when an operator presses the trigger 16. As shown in FIG. 2, the motor 18 includes a stator 26 and a rotor 30. In the illustrated embodiment, the rotor 30 includes a motor output shaft 34 extending from the stator 26 and a pinion 42 is coupled for co-rotation with the motor output shaft 34 (e.g., by an interference fit, a press-fit, etc.). In other embodiments such as the one shown in FIG. 4, the pinion 42 is integrally formed with the output shaft 34.

Figure 2A:
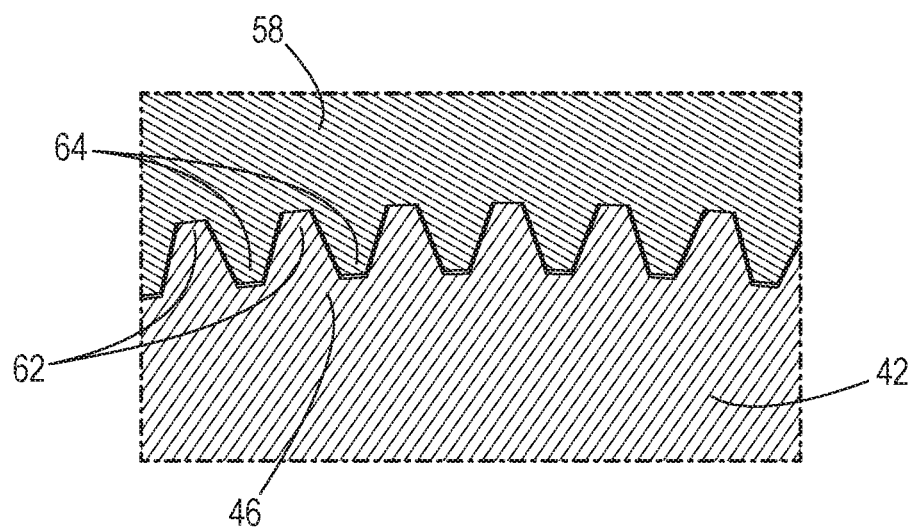
FIG. 2A is an enlarged plan view of the power tool along line 2A-2A in FIG. 2.
Figure 3:
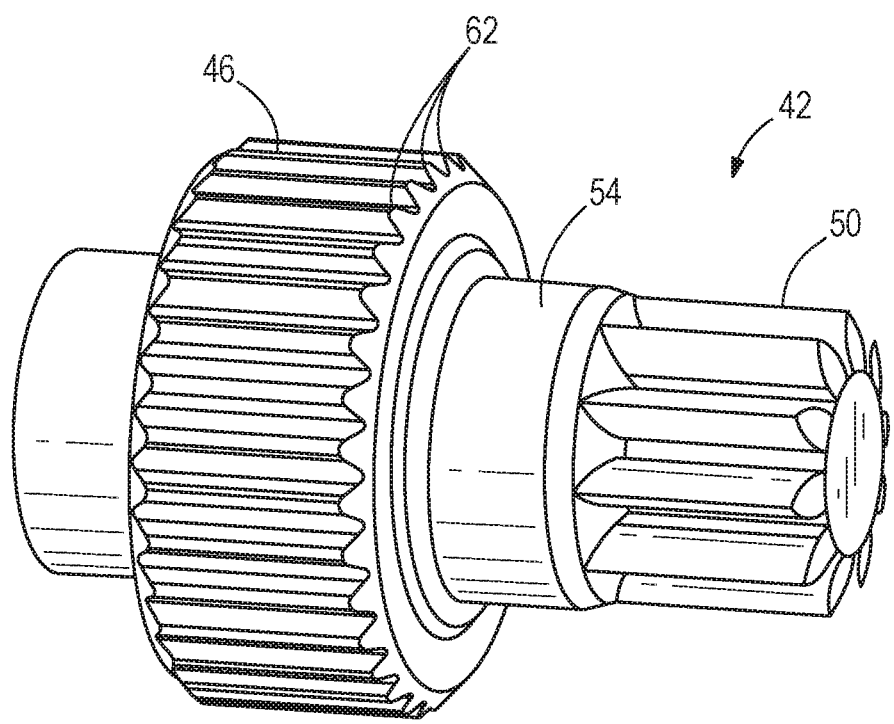
FIG. 3 is a perspective view of a pinion of the power tool of FIG. 1.

As shown in FIGS. 2 and 3, the pinion 42 includes a bushing portion 46, a toothed portion 50, and a cylindrical portion 54 between the bushing portion 46 and the toothed portion 50. The bushing portion 46 is configured to rotatably couple a fan 58 having blades 60 to the pinion 42. In the illustrated embodiment, the bushing portion 46 includes splines 62 and the fan 58 includes corresponding splines 64 that engage the splines 62 of the bushing portion 46 as shown in FIG. 2A, thereby ensuring co-rotation of the fan 58 and the pinion 42. The toothed portion 50 is configured as a sun gear that is meshed with multiple planet gears 66 of the multi-stage planetary transmission 22. The transmission 22 includes a transmission housing 70 that has an opening 74 through which the toothed portion 50 of the pinion 42 extends.

On a side of the transmission housing 70 facing the motor 18, the transmission housing 70 defines a recess 78 for receiving a bearing 82 having an inner race 86, an outer race 90, and a plurality of rollers 94 between the inner and outer races 86, 90. The bearing 82 is arranged on the cylindrical portion 54 of the pinion 42 for rotatably supporting the pinion 42 and the output shaft 34 on the transmission housing 70, which in turn is supported by the power tool housing 14. In some embodiments, the inner race 86 is interference or press-fit to the cylindrical portion 54 and the outer race 90 is slip-fit to the transmission housing 70 within the recess 78.

In operation, an operator presses the trigger 16 of the power tool 10, which activates the motor 18 and causes the output shaft 34 and the pinion 42 to rotate. The fan 58 is also caused to rotate via its connection with the bushing portion 46, resulting in the blades 60 creating a cooling airflow through the motor 18. As the pinion 42 rotates, the rotating toothed portion 50 drives the planet gears of the transmission 22, ultimately causing the spindle 24 to rotate in response to receiving torque from the transmission 22.

Various features of the invention are set forth in the following claims.

What is claimed is:

1. A power tool comprising:
   an electric motor including an output shaft;
   a transmission including a transmission housing;
   a spindle rotatable in response to receiving torque from the transmission;
   a pinion separate from and coupled to the output shaft, the pinion including
      a bushing portion including splines,
      a toothed portion for driving the transmission, and
      a cylindrical portion between the bushing portion and the toothed portion;
   a fan including corresponding splines that engage the splines of the bushing portion; and
   a bearing arranged between the cylindrical portion and the transmission housing for rotatably supporting the pinion and the output shaft.

2. The power tool of claim 1, wherein the bearing includes an inner race that is coupled to the cylindrical portion and an outer race that is coupled to the transmission housing.

3. The power tool of claim 2, wherein the inner race is press-fit or interference-fit to the cylindrical portion of the pinion.

4. The power tool of claim 2, wherein the outer race is slip-fit to the transmission housing.

5. The power tool of claim 2, further comprising a plurality of rollers between the inner race and the outer race.

6. The power tool of claim 1, wherein the transmission is a planetary transmission having a plurality of planet gears.

7. The power tool of claim 6, wherein the transmission housing includes an opening through which the toothed portion of the pinion extends, and wherein the toothed portion of the pinion is configured as a sun gear that meshes with the planet gears.

8. The power tool of claim 7, wherein the transmission housing defines a recess in which the bearing is arranged, and wherein the recess is adjacent the opening.

9. The power tool of claim 1, wherein the pinion is press-fit or interference-fit to the output shaft.

10. A power tool comprising:
    an electric motor including an output shaft;
    a transmission including a transmission housing;
    a spindle rotatable in response to receiving torque from the transmission;
    a pinion separate from and coupled to the output shaft, the pinion including
       a bushing portion including splines,
       a toothed portion for driving the transmission, and
       a cylindrical portion between the bushing portion and the toothed portion;
    a fan including corresponding splines that couple the fan to the splines of the bushing portion, such that the fan is coupled for co-rotation with the bushing portion; and
    a bearing rotatably supporting the pinion and the output shaft, the bearing including
       an inner race coupled to the cylindrical portion of the pinion,
       an outer race coupled to the transmission housing, and
       a plurality of rollers between the inner race and the outer race.

11. The power tool of claim 10, wherein the inner race is press-fit or interference-fit to the cylindrical portion of the pinion.

12. The power tool of claim 10, wherein the outer race is slip-fit to the transmission housing.

13. The power tool of claim 10, wherein the transmission is a planetary transmission having a plurality of planet gears.

14. The power tool of claim 13, wherein the transmission housing includes an opening through which the toothed portion of the pinion extends, and wherein the toothed portion of the pinion is configured as a sun gear that meshes with the planet gears.

15. The power tool of claim 14, wherein the transmission housing defines a recess in which the bearing is arranged, and wherein the recess is adjacent the opening.

16. The power tool of claim 10, wherein the pinion is press-fit or interference-fit to the output shaft.

17. A power tool comprising:
    an electric motor including an output shaft;
    a transmission including a transmission housing and a plurality of planet gears;
    a spindle rotatable in response to receiving torque from the transmission;
    a pinion separate from and coupled to the output shaft, the pinion including
       a bushing portion including splines,
       a toothed portion extending through an opening in the transmission housing and meshed with the planet gears in the transmission housing, and
       a cylindrical portion between the bushing portion and the toothed portion;
    a fan including corresponding splines that couple the fan to the splines of the bushing portion, such that the fan is coupled for co-rotation with the bushing portion; and
    a bearing rotatably supporting the pinion and the output shaft, the bearing including
       an inner race coupled to the cylindrical portion of the pinion,
       an outer race positioned within a recess in the transmission housing adjacent the opening, and
       a plurality of rollers between the inner race and the outer race.

* * * * *